(12) United States Patent
Fox et al.

(10) Patent No.: US 7,472,381 B2
(45) Date of Patent: Dec. 30, 2008

(54) METHOD OF AND INSTRUCTION SET FOR EXECUTING OPERATIONS ON A DEVICE

(75) Inventors: Brian J. Fox, Santa Barbara, CA (US); Jonathan Lixing Lei, Goleta, CA (US)

(73) Assignee: Roaming Messenger, Inc., Santa Barbara, CA (US)

( * ) Notice: Subject to any disclaimer, the term of this patent is extended or adjusted under 35 U.S.C. 154(b) by 930 days.

(21) Appl. No.: 11/006,286

(22) Filed: Dec. 7, 2004

(65) Prior Publication Data

US 2006/0123396 A1   Jun. 8, 2006

(51) Int. Cl.
*G06F 9/45*   (2006.01)

(52) U.S. Cl. ..................... 717/148; 709/202

(58) Field of Classification Search ............... 717/148; 709/202
See application file for complete search history.

(56) References Cited

U.S. PATENT DOCUMENTS

| 6,148,327 | A  | * | 11/2000 | Whitebread et al. | ......... 709/202 |
| 6,539,416 | B1 | * | 3/2003  | Takewaki et al.   | ............ 709/202 |
| 7,024,187 | B2 | * | 4/2006  | Moles et al.      | ................ 455/423 |

* cited by examiner

*Primary Examiner*—John Chavis
(74) *Attorney, Agent, or Firm*—Foley & Lardner LLP

(57) ABSTRACT

A method for executing operations on a device includes executing one or more bytecode language instructions associated with a mobile agent. The mobile agent includes a state of a virtual machine and the bytecode language includes instructions such WARP, MESG, ESEL, ALERT, BROWSE, CAPS, SLEEP, and GPS.

39 Claims, 14 Drawing Sheets

```
RMSG (EY34QGFSEFHE3YQWSD5YW3AA5QEA7FMP) at 0x8075f80:
{
    version: 0.93
    payload: (0 bytes)
    payload @ 0x0:
    machine: (29 bytes)
    machine @ 0x8075f60:
 registers @ 0x0:
    Machine Registers:
    {
        PC: 0
    };
    callstack:[empty]
    Disassembly:
    {
        Stack Segment:
        {
        };

Data Segment:
        {
            D0000: "rmsg://firemarshal/homecomputer"
            D0001: "http://www.google.com/search?q=15+Maple+Court"
            D0002: "Fire at 15 Maple Court, Responding?"
            D0003: "rmsg://HQ@FireDepartment.com/optiplex"
        };

Code Segment:
        {
            C0000: 19 00 00        push      D0000
            C0003: 30              warp
            C0004: 19 00 01        push      D0001
            C0007: 3d              true
            C0008: 5f              browseto
            C0009: 19 00 02        push      D0002
            C0012: 16 00 1e        pint      30
            C0015: 53              mesg
            C0016: 19 00 03        push      D0003
            C0019: 30              warp
            C0020: 10              pop
            C0021: 19 00 02        push      D0002
            C0024: 16 00 0a        pint      10
            C0027: 53              mesg
            C0028: 04              retn
        };
    };
};
```

FIG. 5

METHOD OF AND INSTRUCTION SET FOR EXECUTING OPERATIONS ON A DEVICE

TECHNICAL FIELD

This disclosure relates to executable instructions and, more particularly, to instructions that are executable on a device that receives a mobile agent.

BACKGROUND

As hardwire and wireless communication networks become more imbedded in society, expectancy increases of always being able to contact a particular person at any time. Often business people use a collection of telecommunication products to contact one another and to remain in contact. By carrying cellular telephones, pagers, personal digital assistances (PDA) and the like, a person can be mobile while still remaining in contact for important business and personal messages.

Although, while a person may own a number of wireless devices, due to personal preferences or idiosyncrasies, only one or two of the devices may actually be used by the person. Due to this personal preference, an important message may not be received in a timely manner or possibly not received at all. For example, a business person may prefer to monitor his or her PDA as opposed to their cellular phone or pager. Due to this preference, the person may tend to always keep his or her PDA handy and tend to leave their cell phone and pager in their office or home. Since other people may not be aware of this personal preference, they may attempt to make contact through the cellular phone and pager before attempting to send a message to the PDA during an emergency. While this delay may not have consequences in some instances, scenarios can be imagined in which such a delay is dire. A school may need to contact a parent in the event of an medical emergency and direct them to a particular hospital. By not being aware of the parent's preference to use a PDA, precious time may be lost if the school follows a procedure of only calling and leaving messages on home telephones and cellular phones.

Additionally, each wireless device may operate with a unique computing environment. For example, the operating system used by the cellular phone may be completely different from the operating system used by the PDA. To pass the same message to each of the wireless devices, multiple sets of executable instructions may be included in the message for interacting with each unique operating system encountered.

SUMMARY OF THE INVENTION

In one implementation, a method for executing operations on a device includes executing one or more bytecode language instructions associated with a mobile agent. The mobile agent includes a state of a virtual machine and the bytecode language includes instructions such as WARP, MESG, ESEL, ALERT, BROWSE, CAPS, SLEEP, and GPS.

One or more of the following features may also be included. The method may further include sending the mobile agent from one device to another device such as the mobile agent dispatching device or a different device. The mobile agent sent to the second device represents a changed state of the virtual machine. The mobile agent may be sent to the second device after a timeout period expires at the first device.

The WARP instruction may define transmitting the state of the virtual machine. The MESG instruction may define presenting information on a display. The MESG instruction may define collecting user input. The ESEL instruction may define providing a selection to a user. The ALERT instruction may define issuing an alarm in which the alarm may include presenting a visual alarm or producing an audible alarm. The BROWSE instruction may define initiating an Internet browser. The SLEEP instruction may define a time period to delay executing another instruction. The delay time period may be reduced by an external event. The CAPS instruction may define a word that describes the capabilities of a device that receives the mobile agent. The GPS instruction may define determining global positioning system coordinates.

In another implementation, a computer program product residing on a computer readable medium has stored instructions which, when executed by a processor, cause the processor to execute one or more bytecode language instructions associated with a mobile agent. The mobile agent includes a state of a virtual machine and the bytecode language includes instructions such as WARP, MESG, ESEL, ALERT, BROWSE, CAPS, SLEEP, and GPS.

In still another implementation, an executable instruction set includes bytecode language instructions associated with a mobile agent. The mobile agent includes a state of a virtual machine and bytecode language instructions include instructions such as WARP, MESG, ESEL, ALERT, BROWSE, CAPS, SLEEP, and GPS.

The details of one or more implementations is set forth in the accompanying drawings and the description below. Other features and advantages will become apparent from the description, the drawings, and the claims.

BRIEF DESCRIPTION OF THE DRAWINGS

FIG. 5 is an exemplary listing of code that represents information, including a state of a virtual machine, stored in a mobile agent.

DETAILED DESCRIPTION OF THE PREFERRED EMBODIMENTS

Figure 1:
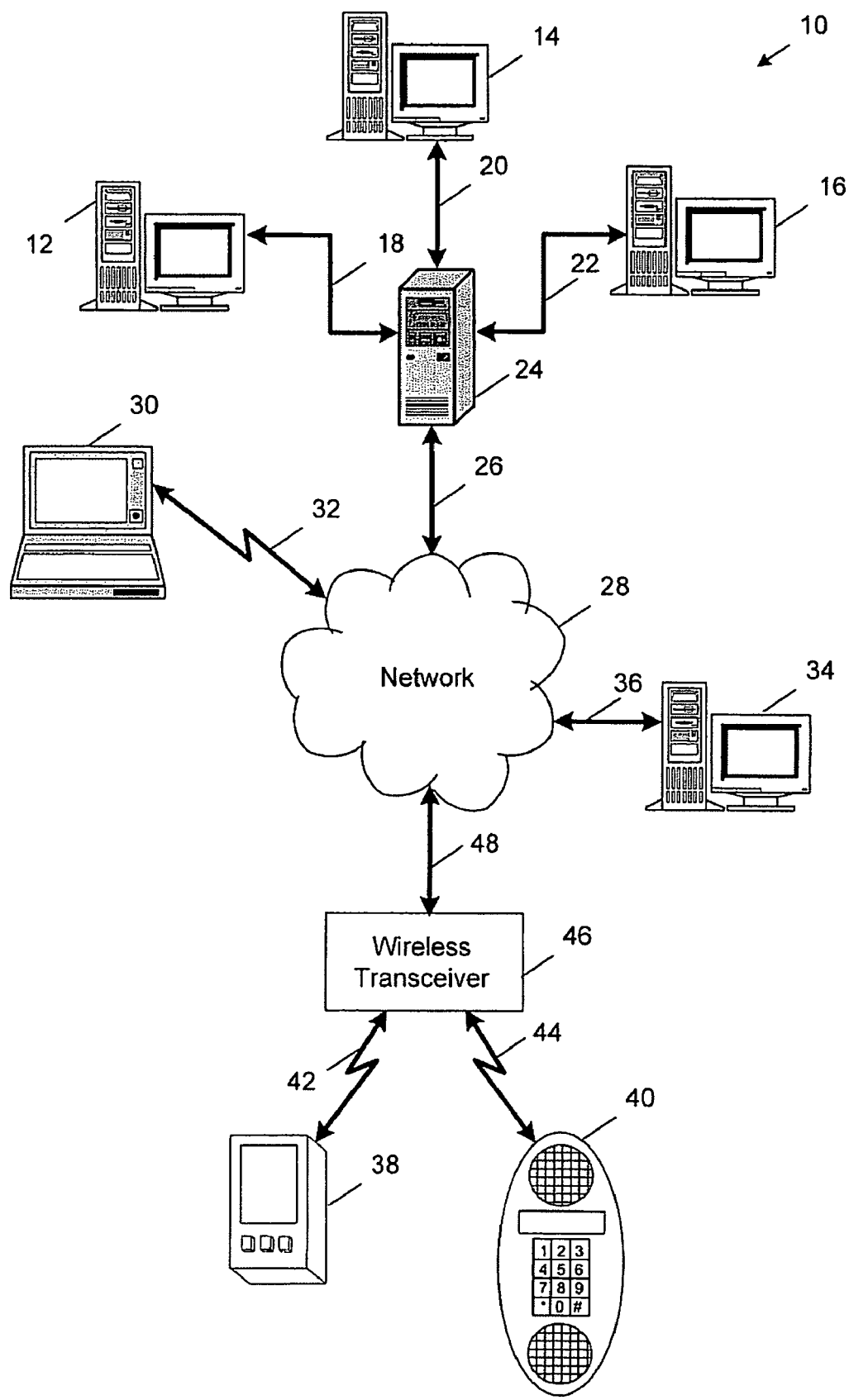
FIG. 1 is a block diagram depicting a network of wireless and hardwire communication devices.

Referring to FIG. 1, a communication system 10 includes a variety of communication devices which are capable of sending and receiving information over hard wire and wireless links. For example, a group of computer systems 12-16 individually connect over respective hardwire links 18-22 to a server 24. By establishing these connections, server 24 operates as a gateway for electronically passing information (e.g., email messages, data files, etc.) among computer systems 12-16. Server 24 also connects over a hardwire link 26 to a network 28 (e.g., the Internet, a wide area network, a local area network, etc.) so that information may be passed among one or more of computer systems 12-16 and other remotely-located communication devices. For example, messages and information may be passed between a laptop 30, via a wireless link 32, and each device that is connected directly or indirectly to network 28. A computer system 34, which may be located at a residence, is connected through a hardwire link 36 so that information may be sent from and received at the residence.

Along with connecting computer systems to network 28 by a hardwire or wireless link (or a combination of hardwire and wireless links), other types of communication devices may be linked to network 28 for information sharing. For example, a PDA 38 and a cellular phone 40 may connect to network 28 by establishing respective wireless links 42, 44 with a wireless transceiver 46 that is connected to network 28 through a hardwire link 48. Similar to server 24, wireless transceiver 46 may provide a gateway connected wireless devices (e.g., PDA 38, cell phone 40, etc.).

By providing such interconnectivity among the devices, information may be broadcast from one device to all of the other connected devices. For example, a message that includes text and or graphics may be broadcast from computer system 12 to each device in communication system 10. Information may also be selectively transmitted to particular devices or groups of devices. For example, a user of computer system 12 may want to send a message only to the particular person that uses computer system 34, PDA 38, and cell phone 40. Additionally, due to the personal preferences of the recipient, the user of computer system 12 may want the message to travel between the devices in a particular sequence. For example, the message may be first directed to the device (e.g., computer system 34) most frequently used by the recipient. Then, if the recipient is not currently using that device, the message is sent to the recipient's next most frequently used device (e.g., PDA 38). Finally, if there is still no indication that the recipient has received the message, the message is passed to the device (e.g., cell phone 40) least used by the recipient. Since the message is being passed to different types of communication devices, a platform-independent message that is compatible with each device is transmitted through communication system 10.

Figure 2:
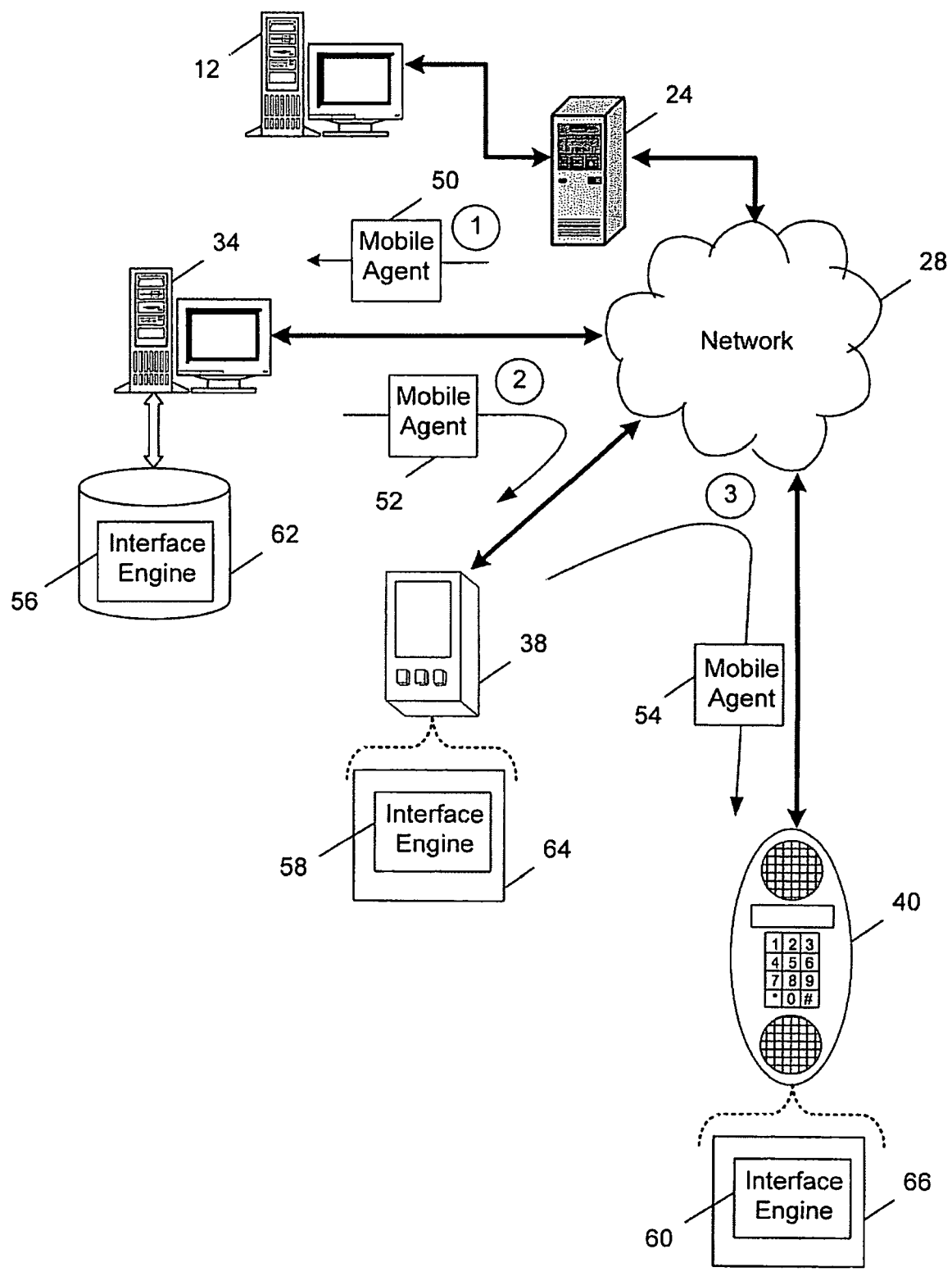
FIG. 2 depicts mobile agents transmitting though a portion of the communication network.

Referring to FIG. 2, a portion of communication system 10 (shown in FIG. 1) is presented to demonstrate transmitting a platform-independent message to devices in a particular sequence. In this example, the message originates at computer system 12 and is first sent to computer system 34, which is located at the recipient's residence, by way of server 24 and network 28. This first leg of the transmission sequence is identified as pathway "1". Based on the message reception at computer system 34 (e.g., the recipient is not present to receive the message), the message may be transmitted to the next most frequently used recipient device. For example, based on the recipient not interacting with computer system 34, the message may then be sent to PDA 38 (i.e., identified as pathway "2"). Simultaneously, or due to no recipient interactions with PDA 38, the message may also be sent to the less frequently used recipient device (e.g., cell phone 40) as identified by pathway "3"). While this example presents relatively simple transmission paths for message travel, one skilled in the art could conceive of rather complex transmission paths that include communication system 10 and other systems not shown. Additionally, while exemplary communication system 10 includes relatively few devices, in other arrangements a communication system may include a large number of devices (e.g., a satellite based communication system) and be capable of transmitting many messages.

To pass information (e.g., messages) among the devices in communication system 10, mobile agents are dispatched from and received by the devices. Continuing the message-sending scenario discussed above, a mobile agent 50 (that stores the message) is produced by and dispatched from computer system 12. Following pathway "1", mobile agent 50 is received by computer system 34. Then as mentioned, based on lack of user interaction with computer system 34, a mobile agent 52 (a modified version of mobile agent 50) is sent to one or more other devices (e.g., PDA 38). Furthermore, additional mobile agents may be sent throughout communication system 10 to provide the message to the intended recipient. For example, if no user interaction occurs response at PDA 38, mobile agent 54 (a modified version of mobile agent 52) is sent to cell phone 40 over pathway "3".

Typically mobile agents 50-54 have a transitory presence and travel in a self-contained fashion such that when they are sent from a device, substantially no trace of the agent remains on the device. For example, once mobile agent 50 is transmitted from computer system 12 to computer system 34, little or no trace of the agent remains on computer system 12. Mobile agents such as mobile agent 50 are relatively small software objects that move from one device to the next to execute one or more instructions (or programs) that are included in the agent. Some mobile agent operate in a "Fire-and-forget" mode in which the agent is transmitted to a device and is no longer under the control of the device from which it was dispatched. By making decisions and acting independently on a recipient device, the mobile agent reduces the workload of the dispatching device. For example, by interacting with users at a device such as computer system 34, processing power and clock cycles of the agent dispatching device (e.g., computer system 12) are conserved for other local operations.

Along with moving executable code, mobile agent 50 includes other types of information. Data such as strings, integers, arrays, data structures, and the like may be inserted into the mobile agent to assist with the execution of one or more instructions at the recipient device. For example, data may be inserted into mobile agent 50 by computer system 12 to assist with subroutine calls. Furthermore, data may be inserted into a mobile agent (e.g., mobile agent 52) by one device (e.g., computer system 34) to direct the mobile agent to another device (e.g., PDA 38).

Each of the mobile agents (e.g. mobile 50, 52, and 54) also include data that represents the operational state of a virtual machine that is also used during instruction execution. In general, a virtual machine is a piece of software that emulates a hardware device (e.g., a computer system, central processing unit, etc.) with a particular architecture by including data that represents portions of the emulated hardware. For example, a virtual machine may include data that represents the state of registers (e.g., a program counter, etc.) and stacks used by a processor. By including this state information, as the mobile agent moves among the devices in a communication system, the recipient device can access and use the stored data (e.g., register content, stack content, etc.) in conjunction its own hardware (e.g., processors, memory, etc.) to execute instructions. Also, by sending the current state of the virtual machine in a mobile agent, instructions are not repeatedly executed at each recipient device to place the virtual machine in a particular state. For example, since the virtual machine stored in mobile agent 52 reflects the instructions executed at computer system 34, instructions are not re-executed at PDA 38 to account for the operations performed at computer system 34. Thus, clock cycles and processing power are not wasted by repeatedly executing instructions.

As operations are executed at different devices (e.g., computer system 34, PDA 38, cell phone 40), the state of the virtual machine correspondingly changes. To account for these changes information is stored in the mobile agent. For example, when received by computer system 34, mobile agent 50 stores the state (e.g., register content, stack content, etc.) of a virtual machine. As instructions are executed on computer system 34, the contents of its registers and stacks change. To reflect these changes the virtual machine state is updated in the mobile agent. Mobile agent 52 represents these changes and is an updated version of mobile agent 50. By storing the updated state of the virtual machine, mobile agent 52 may be directed by to one or more other devices in communication system 10. In this particular example, after directing mobile agent 52 to PDA 38, the state of the virtual machine is again altered by operations executed on PDA 38. Based on these executions, the state of the virtual machine changes with respect to the state stored in mobile agent 52. Mobile agent 54 (a modified version of mobile agent 52) represents these latest changes to the virtual machine state and provides this updated virtual machine to the next recipient device (e.g., cell phone 40).

Each of the mobile agents 50-54 may be received by any type of device in communication system 10 independent of platform type. So, while mobile agent 50 may be directed from computer system 12 to computer system 34, in other arrangements mobile agent 50 may be directed to one or more other types of devices (e.g., PDA 38, cell phone 40, laptop 30, etc.). To receive a platform-independent mobile agent (e.g., mobile agent 50) each device in communication system 10 executes a respective interface engine 56-60 that reside in memory at each device. In particular, interface engine 56 is stored in a storage device 62 (e.g., hard drive, CD-ROM, etc.) that is in communication with computer system 34. Interface engine 56 can then be loaded in memory (e.g., random access memory) for executing on computer system 34. Similarly, PDA 38 and cell phone 40 respectively include memories 64, 66 for executing interface engines 58 and 60.

Along with accessing and retrieving virtual machine states (e.g., register content, stack content, etc.) stored in a received mobile agent, interface engines 56-60 also assist in updating the virtual machines to reflect states changes due to operations executed on the device (e.g., computer system 34, PDA 38, cell phone 40, etc.) where the engine resides. Interface engines 56-60 also interrogate the respective device where engine resides to determine the capabilities and functionality of the device. For example, interface engine 56 determines what particular software packages (e.g., Internet browser, email system, etc.) reside on and may be executed by computer system 34. Additionally interface engine 56 may determine the location and pathway to executable files and commands associated with the software packages. By determining their locations and pathways, interface engine 56 can initiate execution of the software packages for performing particular functions (e.g., execute the Internet browser to initiate an Internet search).

The following example is provided to demonstrate the mobility and adaptability of the platform independent mobile agents and the stored virtual machines. In this example, communication system 10 is used for alerting government officials such as a town fire marshal to emergency information. Computer system 12 is located at a city hall and serves as a nerve center that distributes emergency information to appropriate city officials and employees. In this example city hall has been alerted to a house fire and computer system 12 is used to dispatch a message to a fire marshal who is currently off duty. Based on information stored in computer system 12, personnel at city hall determine that the fire marshal typically checks his home computer (i.e., computer system 34) for alerts and messages. Less frequently the fire marshal checks his PDA 38 and his cell phone 40 for emergency messages. Based on this information an emergency message is stored in mobile agent 50 and the agent is dispatched from computer system 12 and sent via server 24 and network 28 to computer system 34. Upon arriving at computer system 34, mobile agent 50 is detected by interface engine 56 and the virtual machine included in the agent is accessed e.g., to retrieve register and stack contents from the virtual machine.

Executable instructions are also retrieved from mobile agent 50. In conjunction with interface engine 56, the instructions are interpreted and executed so that an alert message is presented on computer system 34. A visual message may be displayed on a monitor included in computer system 34. Also, if interface engine 56 determined that computer system 34 is capable of producing audio signals (e.g., includes an sound card), executable instructions in mobile agent 50 for producing an audible tone are interpreted and executed as directed by interface engine 56.

Figure 3:
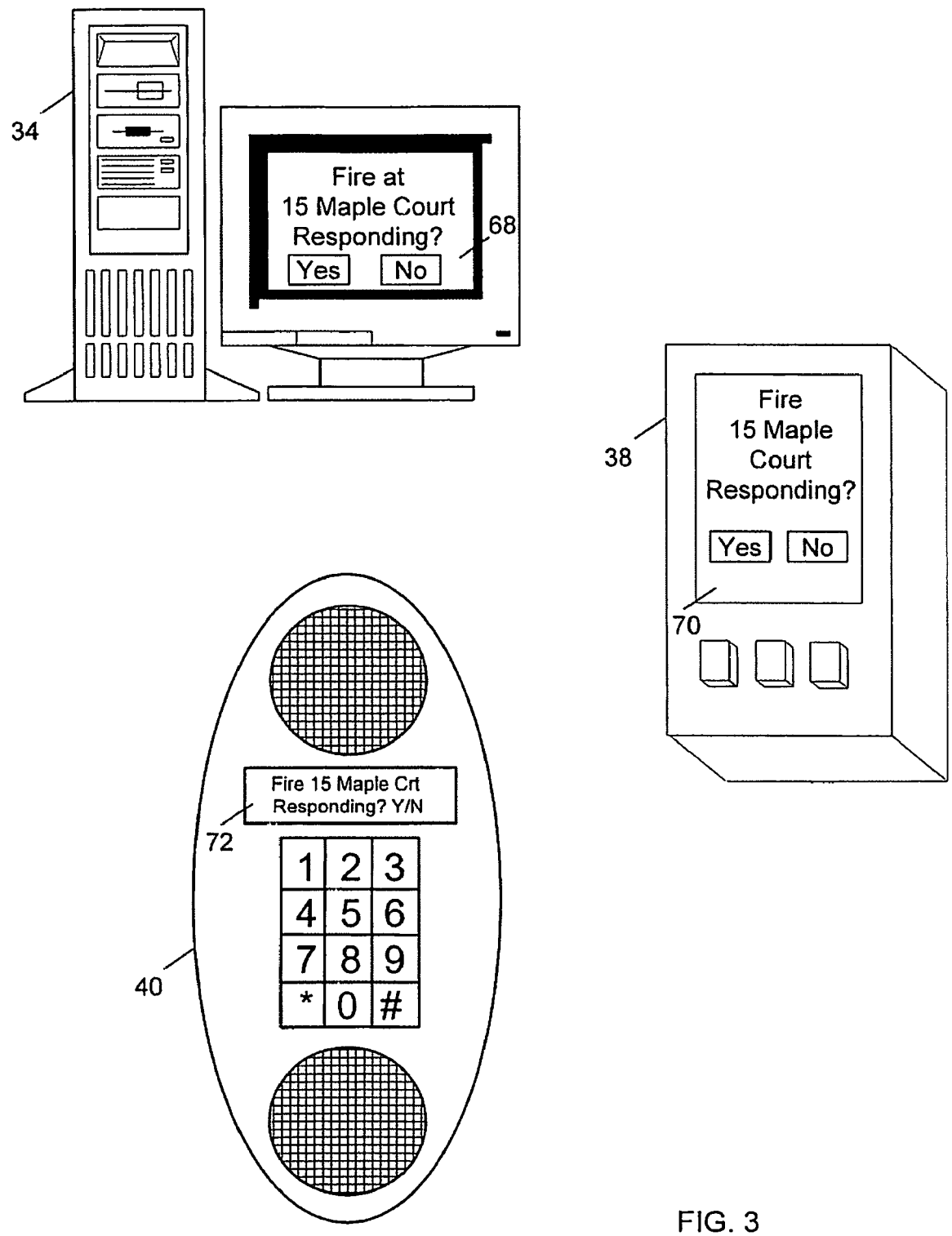
FIG. 3 depicts a message and input request being presented on three different communication devices.

Referring to FIG. 3, a message 68 is displayed on computer system 34 that requires user input to acknowledge the message. In this example, an input device (e.g., mouse keyboard, etc.) is used by the user to select whether he or she is going to respond to the fire at the displayed location. Regardless of which selection is made, the state of the virtual machine in mobile agent 50 is updated to reflect the user selection. Once updated, mobile agent 50 may be sent back to computer system 12 to alert city hall to the intention of the fire marshal.

In this example, after presenting message 68 for a particular time period, a time out occurs and mobile agent 50 is updated to reflect the lack of user interaction. For example, after two minutes, if the fire marshal has not made a selection, an assumption is made that the he or she is not currently using computer system 34. An updated mobile agent (e.g., mobile agent 52) is then dispatched to another device as identified by information stored in mobile agent 50. Here mobile agent 52 is directed to PDA 38 to continue attempting to alert the fire marshal. Similar to interface engine 56 in computer system 34, interface engine 58 interrogates PDA 38 to determine its functionality and capabilities for assisting in executing instructions. Based on information associated with the functionality along with capabilities, along with instructions in mobile agent 52, PDA 38 displays an alert message 70 that includes the selections that were displayed in alert message 68.

Similar to computer system 34, the message presented on PDA 38 times-out after a period as specified by data included in mobile agent 52. If a selection is entered into PDA 38, the contents of the virtual machine is updated to account for the selection and may be sent back to computer system 12 to alert city hall of the selection. Also, other mobile agents may be sent throughout communication system 10 from PDA 38 to disseminate the entered selection. For example PDA 38 may also send a mobile agent to computer system 34 to provide the selection to people at the fire marshal's residence.

In this example, if a time-out occurs while PDA 38 displays alert message 70, PDA 38 updates the mobile agent (represented as mobile agent 54) to reflect that no selection has been made and sends mobile agent 54 to the next device associated with the fire marshal. Here, cell phone 40 is the least frequently used device by the fire marshal and mobile agent 54 is sent from PDA 30 to this device. Similar to the previous two recipient devices, interface engine 60 assists in accessing the virtual machine stored in mobile agent 54. Additionally, interface engine 60 assists in interpreting and executing instructions included in mobile agent 54 to present an alert message 72 on cell phone 40. Along with the visual alert message 72, an audible alert may be initiated from the instructions included in mobile agent 54.

In this particular example mobile agents were passed one at a time among a particular group of devices in communication system 10. However, multiple mobile agents may simultaneously propagate through system 10 to one or more devices. Also, in this example telecommunication devices were used to dispatch and receive the mobile agents. However, other similar types of electronic devices may be incorporated into a system for passing mobile agents. For example one or more microprocessors may form a communication system and each microprocessor or different portions of each microprocessor may be defined as a device that passes mobile agents. Furthermore, by including a virtual machine in each mobile agent passed throughout the system, processing time at each device may be reduced since the current state of the virtual machine is provided to a recipient device without instructions being repeatedly executed.

Figure 4:
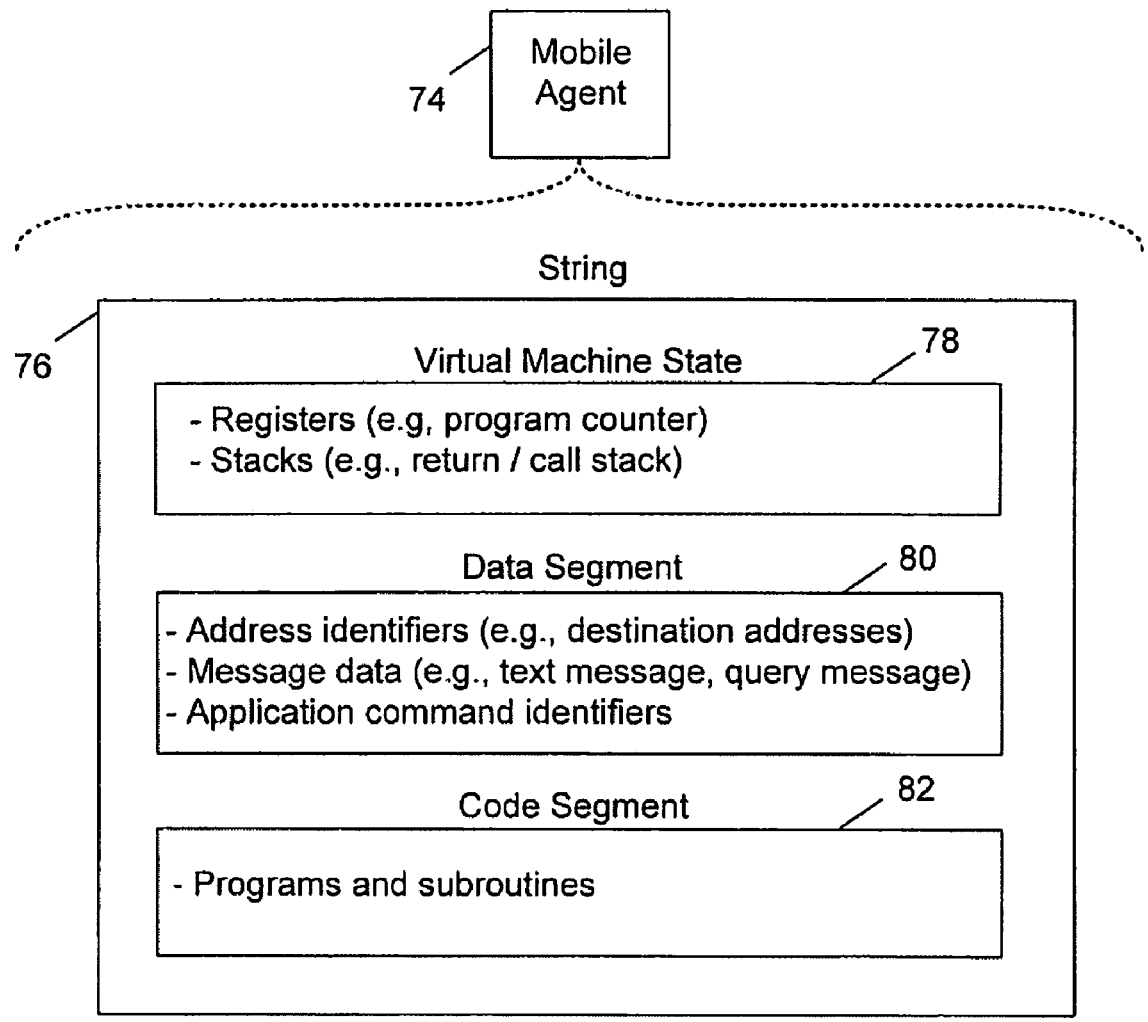
FIG. 4 is a block diagram that represents a mobile agent that stores the state of a virtual machine.

Referring to FIG. 4, a mobile agent 74 is presented to represent the contents of a typical mobile agent such as mobile agents 50-54. To store data, mobile agent 74 includes a string 76 (i.e., a series of consecutive characters) that is segmented to represent different information. One string segment 78 represents the current state of the virtual machine stored in mobile agent 74. Upon mobile agent 74 arriving at a device (e.g., computer system 34), string segment 78 is accessed to assist with interpreting and executing instructions on the device. In this example, the state of the virtual machine is represented by the content of registers (e.g., a program counter, etc.) and one or more stacks (e.g., return/call stack, etc.). By storing the content of register such as a program counter, the virtual machine retains the location to being executing instructions in a program or subroutine so that the recipient device (e.g., PDA 38) is aware of the location where processing was halted at another device (e.g., computer system 34).

String 76 also includes a string segment 80 that stores various data that is used in executing instructions and assisting in performing other operations. For example, data identifying one or more device addresses may be included in string segment 80. By storing device addresses (e.g., address of computer system 34, PDA 38, etc.) associated with a particular user, a logical sequence can be determined for delivering mobile agent 74. Textual (e.g., "Fire 15 Maple Court, Responding?") and graphical data along with other data types (e.g., data structures, sound files) may also be included in string segment 80. Also, data associated with user-device interactions may be included. For example, a list of potential user responses (e.g., "Yes", "No", etc.), or other types of data associated with user interactions may be included. Additionally, graphical data (e.g., selection buttons, menus, etc.) may be included to assist with interfacing with a user. Textual data may also be included to assist with executing particular types of applications and executing operations associated with applications. For example, data may be included for executing application operations such as directing an Internet browser (e.g., Microsoft™ Internet Explorer™) to a particular website by including a uniform resource locator (URL) of the website in string segment 80.

To provide the recipient device with executable instructions, a string segment 82 is also included in string 70. Typically string segment 82 includes instructions from a compact programming language. In this example, bytecode instructions are used in programs and subroutines included in string segment 82. In general, bytecode is a type of programmable language that encodes instructions in single bytes so that an interpreter can relatively quickly determine the function or functions to execute. The bytecode instructions included in string segment 82 can be executed independent of platform type and are not tailored for executing on a specific type of device (e.g., computer system 34, PDA 38, cell phone 40, etc.). Furthermore, since the virtual machine state is transmitted with instructions in string 76, the current content of the virtual machine is used to assist in interpreting the bytecode instructions or to assist in compiling the bytecode for execution on the recipient device.

String 76 may also be processed prior to being inserted into mobile agent 74. For example, the entire string or part of the string may be compressed using a compression technique that is known by people skilled in the art. Typically, if string 76 is compressed, an interface engine such as engine 56 is capable of decompressing the string prior to extracting data. Also, to update a mobile agent, the interface engine may be capable of compressing a modified version of string 76 (or a portion of the string) for storing in the mobile agent.

Referring to FIG. 5, a code listing 84 is presented that is exemplary of code included in a string such as string 76. In particular, code listing 84 includes a virtual machine section 86, a data section 88, and an instruction section 90. Virtual machine section 86 includes a structure 92 that includes the contents of each register in the virtual machine. In this example, structure 92 includes a variable (i.e., "PC") that stores the contents of a program counter. This variable emulates the program counter in a central processing unit (CPU) that stores the address of the next instruction to be executed. By tracking the next instruction to be executed, as the mobile agent that stores code listing 84 moves about a communication system, the virtual machine identifies the next instruction to be executed after the agent is received by a recipient device. Along with register information, other information is included in virtual machine section 86. A structure 94 includes the content of stacks being used by the virtual machine. For example, a stack may be included in structure 94 for storing data used during bytecode instruction execution.

Data section 88 stores data that is used for a variety of operations and is placed into data registers for use during instruction execution. For example, data register D0000 and D0003 respectively contain addresses of destination computer systems. For example, data in register D0000 may represent the address of computer system 34 and data in register D0003 may represent the address of computer system 12. Data register D0001 stores a string of text for executing an operation (e.g., a "google" search) on an application (e.g., an Internet browser) resident at a recipient device. Again to execute the application, an interface engine residing at the recipient device locates and executes the particular application. Data stored in data register D0002 includes a textual message that is displayed on the recipient device when a particular bytecode instruction is executed.

Instruction segment 90 includes a listing of bytecode instructions that when executed use data segment 88 and the current state of virtual machine 86. In this example, the bytecode instructions insert ("push") data from data segment 88 onto a stack. Other bytecode instructions respectively access the stack to retrieve and use the stored data. For example, a bytecode instruction 96 ("mesg") retrieves data (i.e., "Fire at 15 Maple Court, Responding?") that is placed on the stack and presents the data on the device (e.g., computer system 34) that executes the instruction. If a user enters an input (e.g., selects "Yes" or "No"), data representing the user input is sent to another location (e.g., Fire Department headquarters) with another bytecode instruction ("warp") 98. If a user input is not detected over a predetermined time period (e.g., the user is not near the device), a time out occurs and the mobile agent that stores code listing 84 is sent to another device for user input.

Along with being platform independent, the bytecode instructions are compact so that relatively small memory amounts are needed for storing the instructions in the mobile agents. By keeping the memory amounts small, the mobile agents can be efficiently transmitted among devices while improving overall system functionality. The bytecode instructions initiate operations that are completely general in nature and are not tailored for executing specific operations associated with the mobile agents. Since the instructions are used to execute general operations, programs and subroutines with arbitrary operations can be written and executed on different types of devices (e.g., computer system 34 and cellular phone 40).

Figure 6:
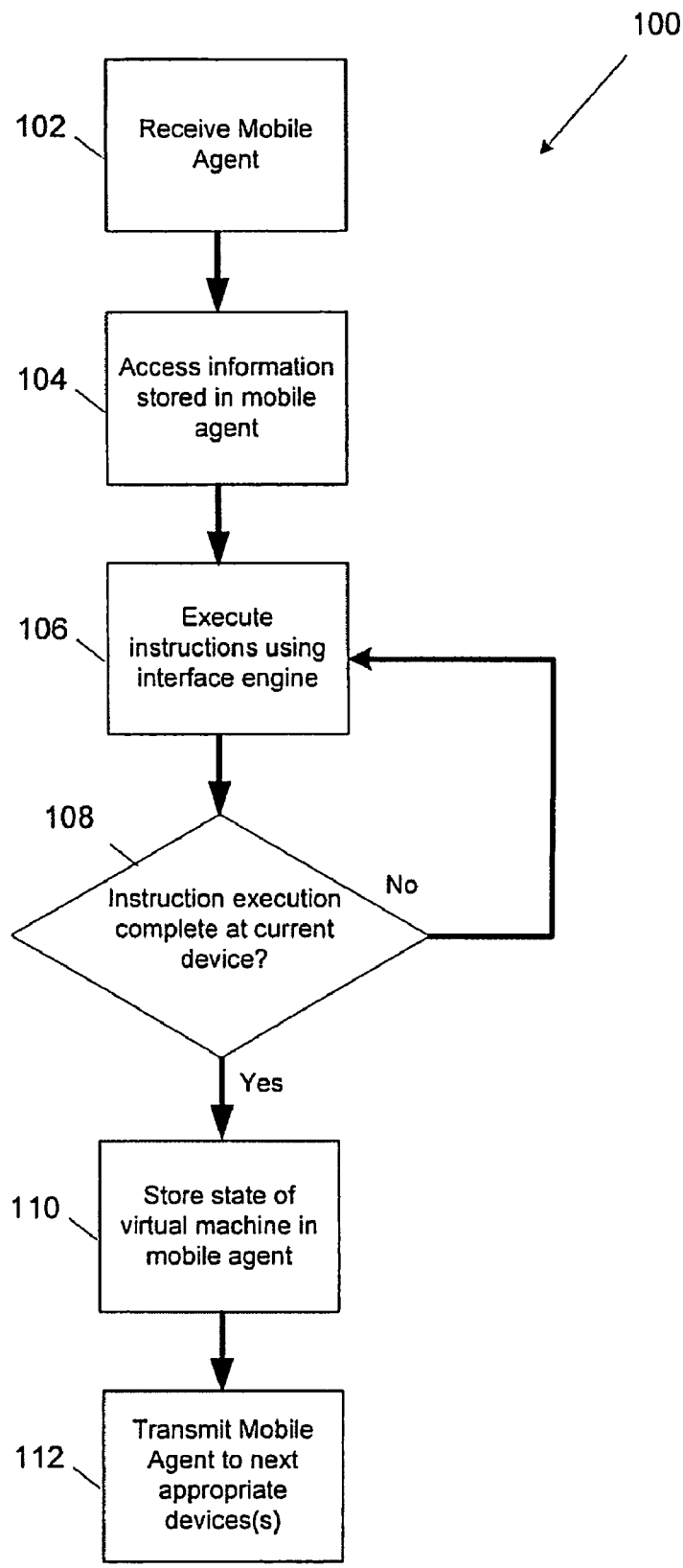
FIG. 6 is a flow chart that represents interactions between a mobile agent and a recipient communication device.

Referring to FIG. 6, a flow chart 100 represents individual and joint actions of a mobile agent (e.g., mobile agent 74) and a recipient device (e.g., computer system 34, PDA 38, cell phone 40, etc.) for executing one or more platform-independent instructions included in the mobile agent. Upon receiving 102 the mobile agent, the recipient device accesses 104 information stored in the mobile agent. As described, the mobile agent stores the state of a virtual machine along with data that identifies one or more instructions for executing on the recipient device. An interface engine (e.g., interface engine 62) that resides on the recipient device provides assistance to interpret and execute the instructions provided by the mobile agent. For example, by interrogating the capabilities of the recipient device, the interface engine provides access to the applications and data that reside on the recipient device.

As instructions are executed 106, the mobile agent monitors 108 for when instruction execution is complete on the recipient device. For example, if a time-out occurs, the mobile agent may determine that instruction execution is complete on the recipient device and the time has arrived to transfer to another device. Sometimes the mobile agent may determine to suspend instruction execution at the recipient device and temporarily move to another device (e.g., PDA 38) that is capable of performing a particular operation. For example, if PDA 38 includes a global position system (GPS) receiver, the mobile agent may temporarily transfer to this device to determine the GPS location of the PDA. Upon determining the GPS fix, the mobile agent may return to the original recipient device.

Once the mobile agent has determined that the execution of the appropriate instruction or instructions is complete, data is stored 110 in the mobile agent that represents an updated state of the virtual machine due to the instruction execution. For example, for each instruction executed, a program counter is incremented. To indicate the increased value of the program counter, the value is stored in the virtual machine. By updating the program counter (along with other registers and stacks represented in the virtual machine), the updated state of the virtual machine is stored in the mobile agent prior to it departing 112 to one or more other devices for further processing. By updating the state of the virtual machine, the mobile agent indicates which instructions have already been executed and do not need to be executed again at the next recipient device or devices.

Various types of bytecode instructions may be included in the platform-independent bytecode language that is executable on one or more recipient devices. Some of these bytecode instructions include operators that are titled "WARP", "MESG", "ALERT", "BROWSE", "CAPS", "SLEEP", and "GPS" and are described below. Some of these commands provide general functions such as initiating the transmitting of a mobile agent from one device to another. Alternatively, some instructions are more specialized for executing specific functions such as collecting coordinates that represent a GPS location.

Figure 7:
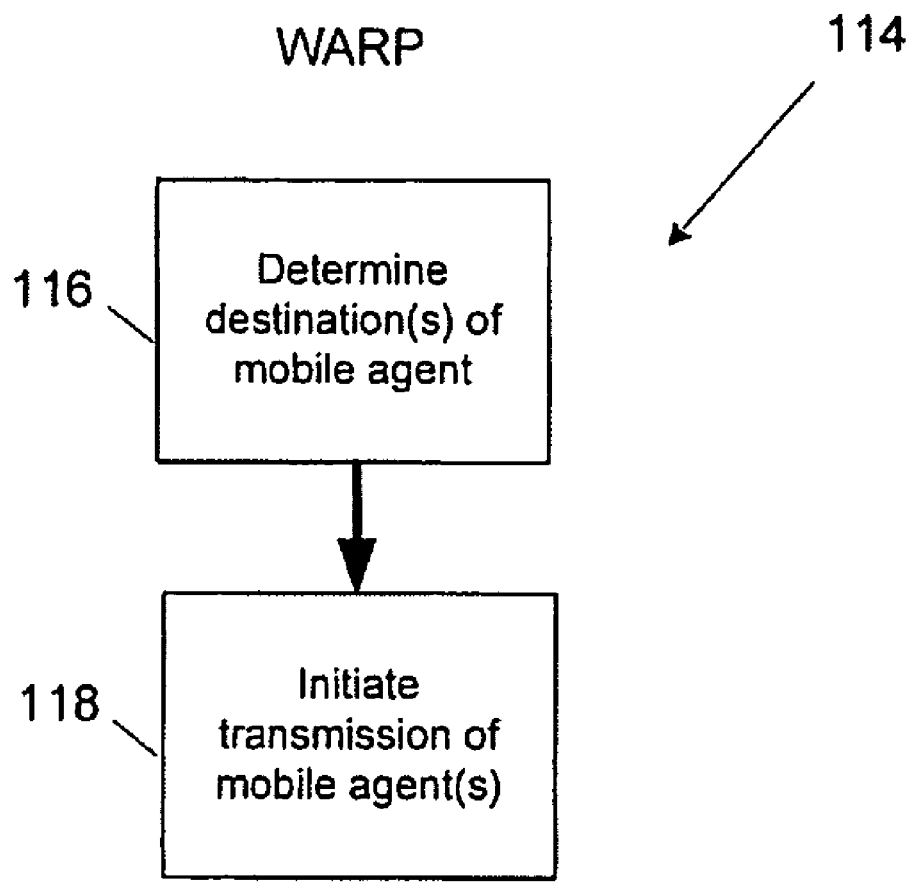
FIG. 7 is a flow chart that represents operations initiated by executing a WARP bytecode instruction.

Referring to FIG. 7, a flow chart 114 represents the operations of the WARP bytecode instruction. This instruction is used to send one or more mobile agents to one or more destination devices such as computer system 34 or cellular phone 40. By executing the WARP instruction, the one or more destinations of a mobile agent are identified. This determination can be based on data included in the mobile agent and/or data included in the device that executes the WARP instruction. For example, a list of destination devices may be included in the mobile agent and be accessed by the WARP instruction to identify the next recipient device. Alternatively, the device that executed the WARP instruction may store data for directing the mobile agent to one or more other devices.

In some arrangements, predefined conditions may be stored in the mobile agent or in the device (executing the WARP instruction) that are used to determine the next destination of the mobile agent. For example, a predefined condition may direct the mobile agent to one device if the condition is met or direct the mobile agent to another device if the condition is not met.

The WARP instruction may also trigger the storing of the current state of the virtual machine into the mobile agent as was described in conjunction with FIG. 6. Along with storing the state of the virtual machine, the WARP instruction may initiate compressing of the virtual machine state, along with other data, prior to being stored in the mobile agent.

Upon determining 116 the one or more destinations of the mobile agent, transmission 118 of one or more mobile agents is initiated by executing the WARP bytecode instruction. In some arrangements only one mobile agent is sent to a destination device. However, if there are multiple destinations, copies of the mobile agent are produced and transmitted to the respective destinations. In some cases the mobile agent copies may be identical, but sometimes two or more unique mobile agents are sent to different destinations.

Figure 8:
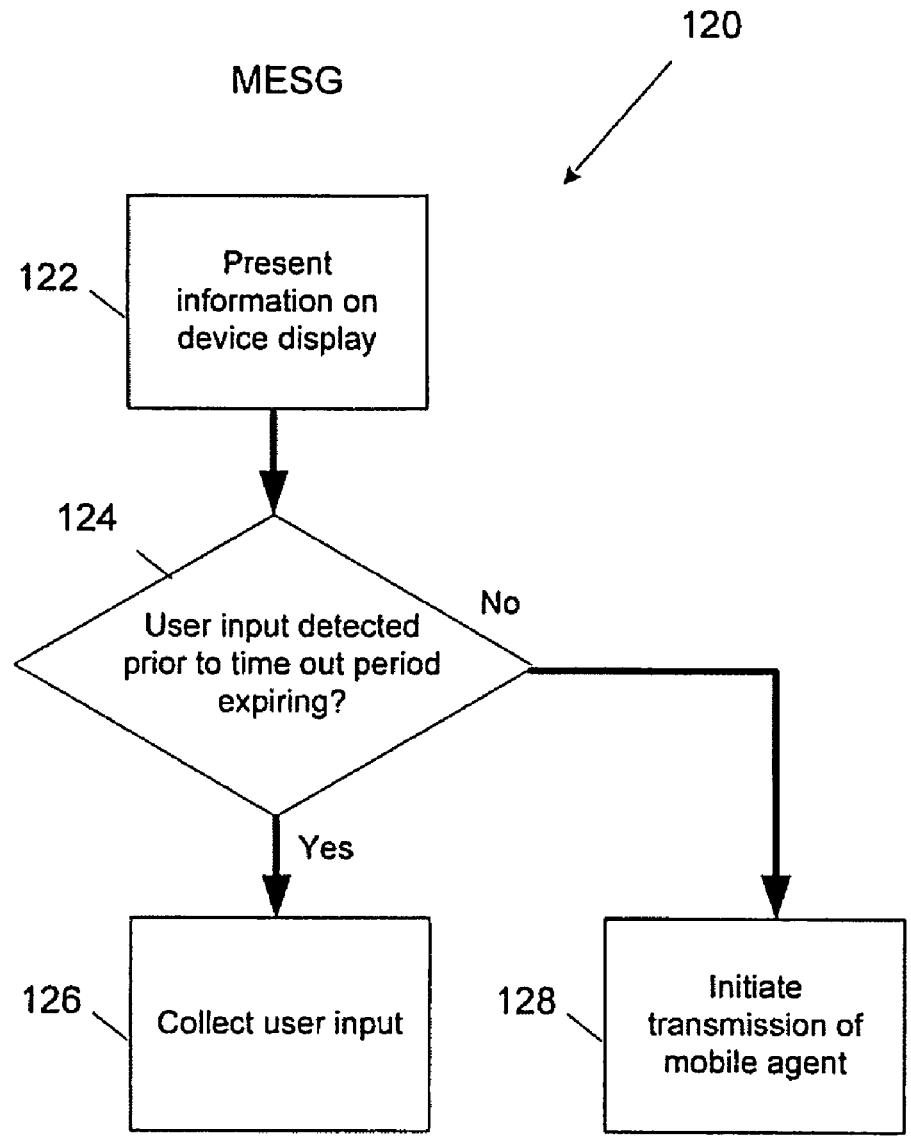
FIG. 8 is a flow chart that represents operations initiated by executing a MESG bytecode instruction.

Referring to FIG. 8, a flow chart 120 represents the operations of the MESG bytecode instruction. In general the MESG instruction presents 122 information on the device that executes the instruction. For example, by executing the MESG instruction on PDA 38, textual and graphical information (e.g., "Fire 15 Maple Court, Responding?") is displayed on the screen of PDA 38. The MESG bytecode instruction then determines 124 if a user is using the device by detecting user input. If a user is present and input is detected, the input is collected 126. For example, after the message "Fire 15 Maple Court, Responding?" is presented, a user may enter a response (e.g., "Yes", "No", etc.) into PDA 38. Once collected the response may be used for executing additional instructions or used at another destination. If no user input is detected after a period of time (i.e., a time out period), the MESG bytecode instruction initiates transmission 128 of the mobile agent. By transmitting the mobile agent to one or more devices, the user (e.g., a fire marshal) may be tracked down at another location and presented the information.

Figure 9:
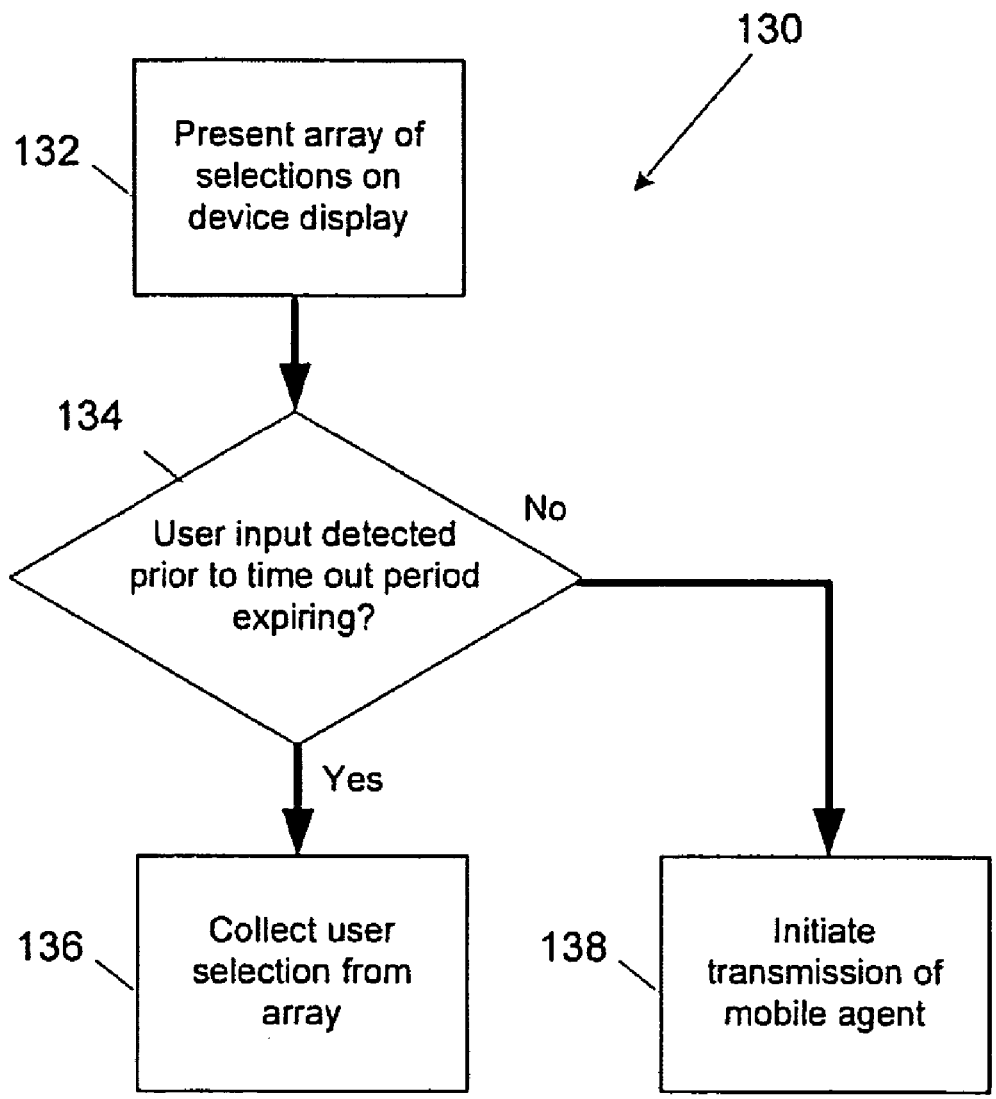
FIG. 9 is a flow chart that represents operations initiated by executing a ESEL bytecode instruction.

Referring to FIG. 9, a flow chart 130 represents the operations of the "select options" (ESEL) bytecode instruction. In general the ESEL instruction is used to present 132 an array of items to a user for making one or more selections. For example, an array may include textual elements (e.g., "Yes", "No", etc.), numerical elements, or graphical elements. Once presented, the executed ESEL instruction determines 134 if input from a user has been received. In this example, if a particular period of time (i.e., a time out period) has expired prior to detecting user input, the device is considered idle. The time out period may range from a relatively short time period (e.g., milliseconds) or a longer time period (e.g., seconds, minutes, hours, etc.). Typically this time period is the approximate time needed for a near-by user to pick up the device and enter an input. If user input is detected prior to the time out period expiring, the user selection(s) from the array is collected 136 and potentially used with other instructions. If the time out period expires prior to detecting any user input, the ESEL instruction initiates the transmission of the mobile agent to one or more devices.

Figure 10:
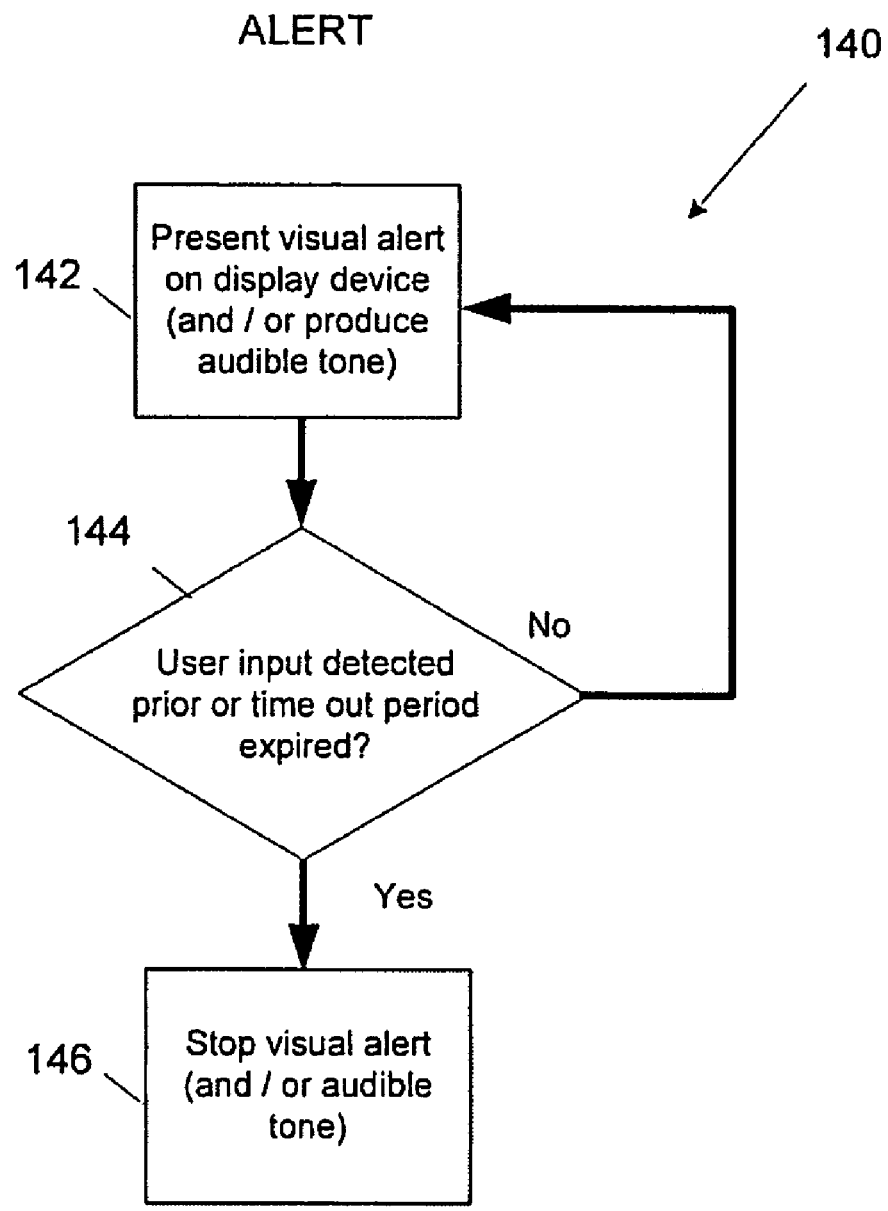
FIG. 10 is a flow chart that represents operations initiated by executing an ALERT bytecode instruction.

Referring to FIG. 10, a flow chart 140 represents the operations of the ALERT bytecode instruction. As the instruction name suggests, by executing the ALERT instruction the device executing the instruction issues one or more signals to quickly gain the attention of the user. For example, to signal the user, a visual alert may be presented 142 on a display of the device. This visual alert may include graphics, text, or images that each may be highlighted, flashing, or implement other attention-grabbing techniques. In addition to visual alerts, other types of alert signals may be produced individually or in combination with the a visual alert by executing the ALERT instruction. For example, an audible tone may be produced and played through a speaker that is included in the device that executed the instruction. Other types of alert signals may include vibrations produced by a transducer that is in the device (e.g., cellular phone 40). Execution of the ALERT instruction also determines 144 if user input has been detected or if a time period has expired. As previously mentioned this time out period may range from a relatively short time period (e.g., milliseconds) to longer periods (e.g., seconds, minutes, hours, etc.). Once the time out period expires or user input is detected, the ALERT instruction stops 146 the production of the alert signal or signals. If user input has not been detected prior to the time out period expiring, the alert signal or signals continue in a repetitive fashion until the time out expiration or user input is detected.

Figure 11:
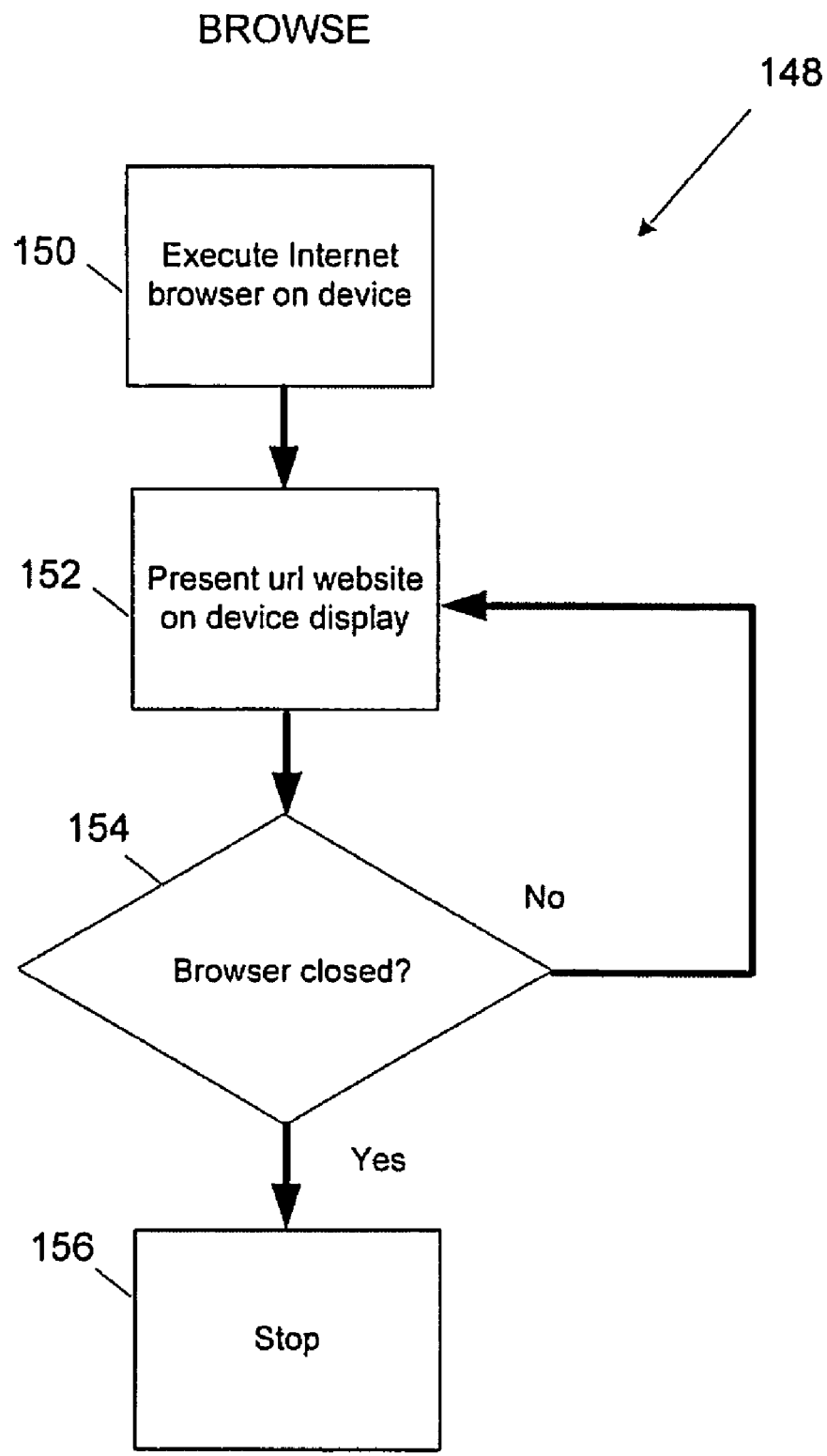
FIG. 11 is a flow chart that represents operations initiated by executing a BROWSE bytecode instruction.

Referring to FIG. 11, a flowchart 148 represents the operations of the BROWSE bytecode instruction. Similar to the other previously mentioned instructions, this instruction is may also be stored in one or relatively few bytes of memory. When executed on a device, this bytecode instruction initiates execution 150 of an Internet browser (e.g., Microsoft Explorer™, Netscape Navigator™, etc.) that is resident on the device. To determine which executable Internet browser resides on the device, the bytecode instruction CAPS (described below) is typically executed on the device. After initiating execution of the Internet browser, the BROWSE instruction performs one or more operations with the browser. For example, data representing a uniform resource locator (URL) address may be retrieved from a stack (or other type of memory structure) for presenting 152 a particular website or webpage on the device. Once displayed, the user may interact with the website by inputting data into the device or just viewing the provided information. The BROWSE instruction also determines 154 if execution of the browser has been terminated. Typically, the browser is closed by a user of the device that executed the browser. However, execution of the browser may also be terminated by other mechanisms such as by the execution of another instruction. So long as the browser is executing, the website or webpage is presented on the device. However, if the browser is closed, the BROWSE instruction halts 156 further operations.

Figure 12:
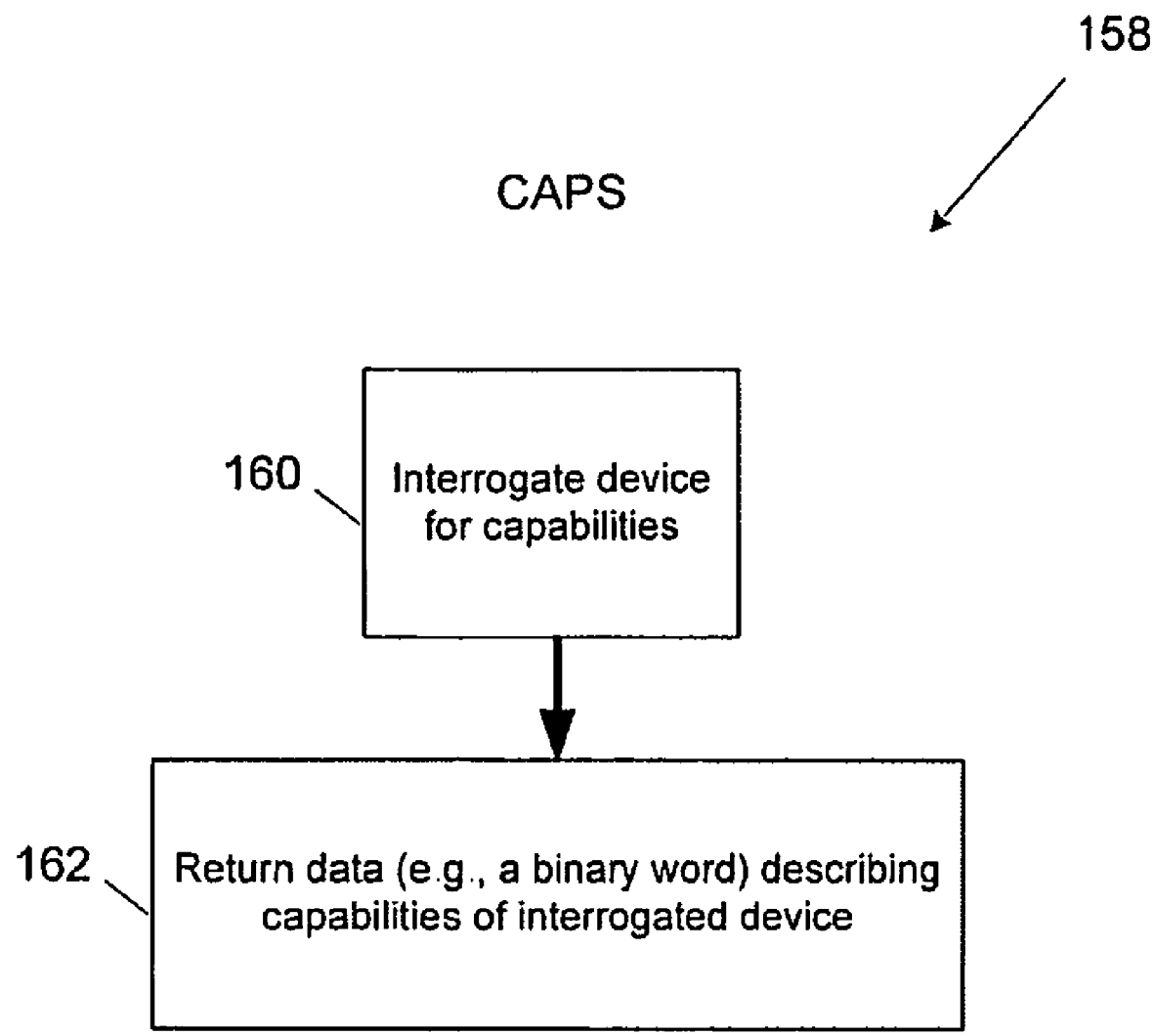
FIG. 12 is a flow chart that represents operations initiated by executing a CAPS bytecode instruction.

Referring to FIG. 12, a flow chart 158 represents the operations provided by executing the CAPS bytecode instruction. The CAPS instruction is used to determine the capabilities and functionality of the device that executes the instruction. For example, this instruction determines the software capabilities of the device such as resident applications (e.g., Internet browsers, databases, compilers, etc.) that are present on the device and their respective storage locations (e.g., hard drive, directory location, etc.). Hardware capabilities are also interrogated by the CAPS instruction. For example, the type of processor present in the device and the number of ports may be determined. Internal cards (e.g., graphic cards) and additional processors (e.g., coprocessors, specialized processors, etc.) may also be identified by executing the CAPS instruction. By determining the capability and functionality of the device that executes the CAPS instruction, the computational environment is efficiently determined prior to executing other bytecode instructions. For example, by identifying the Internet browser present on the device, the BROWSE bytecode instruction can determine the appropriate file (and its location) to be executed.

In this example, the CAPS instruction interrogates 160 the hardware and software capabilities of the device and then returns 162 data that represents the capabilities of the device. In one example, a binary word is returned by the instruction that includes a number of bits that represent the device capabilities. One group of bits may represent the particular operating system (e.g., Microsoft XP™) being used by the device while another bit may represent if the device includes additional hardware such as a GPS receiver.

Figure 13:
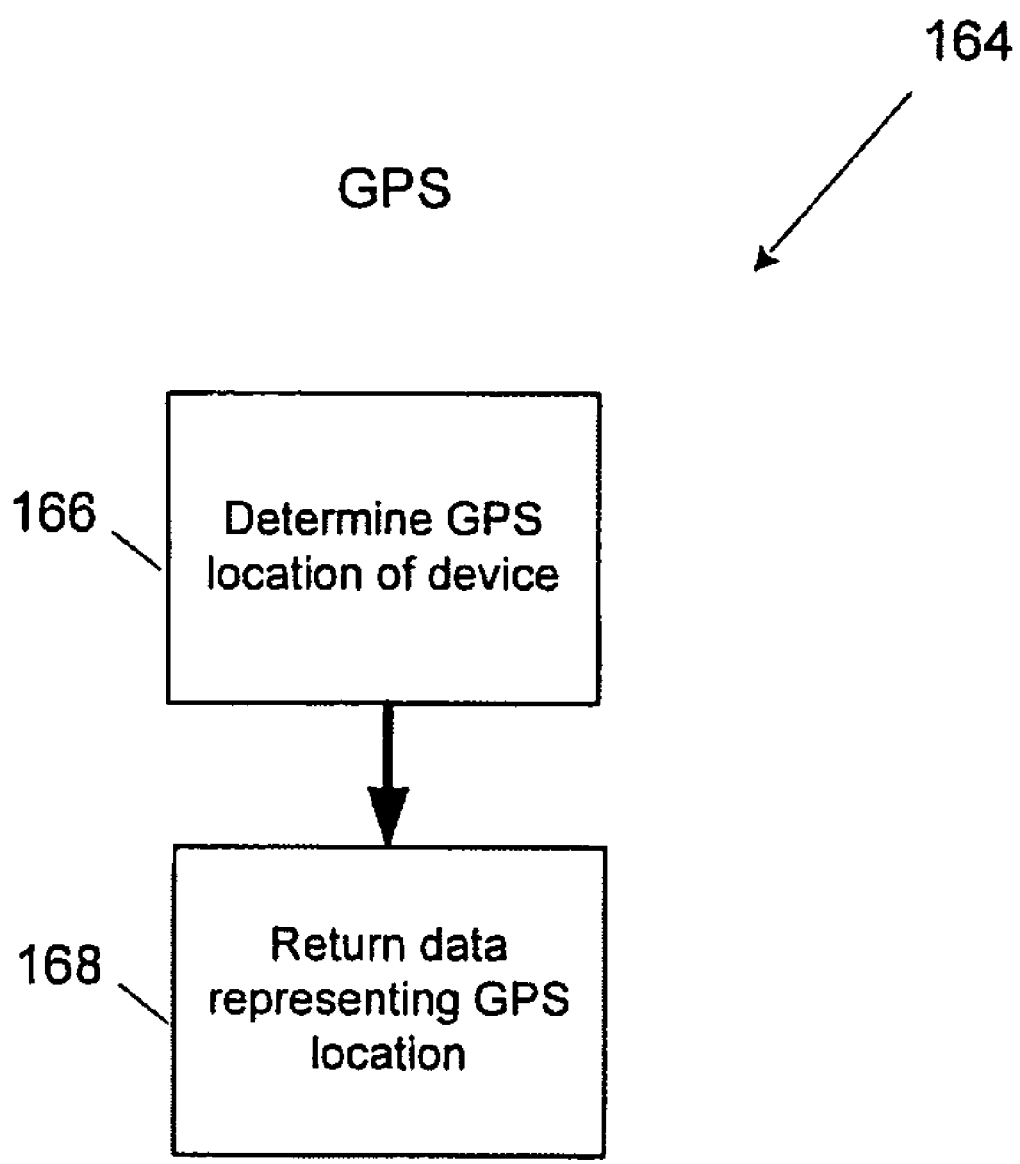
FIG. 13 is a flow chart that represents operations initiated by executing a GPS bytecode instruction.

Referring to FIG. 13, a flowchart 164 represents the operations provided by the GPS bytecode instruction. The GPS instruction is used to determine 166 the geographic location of the device that executes the instruction. Once determined, coordinates representing the location are returned 168 and may be stored in a mobile agent for transit to one or more other devices. To determine the location, the GPS instruction uses a GPS receiver that is included or is in communication with the device that executes the instruction. By providing GPS coordinates and sending them in a mobile agent, devices (e.g., cellular phone 40) and the user carrying the devices can be tracked from other locations (e.g., computer system 34).

Figure 14:
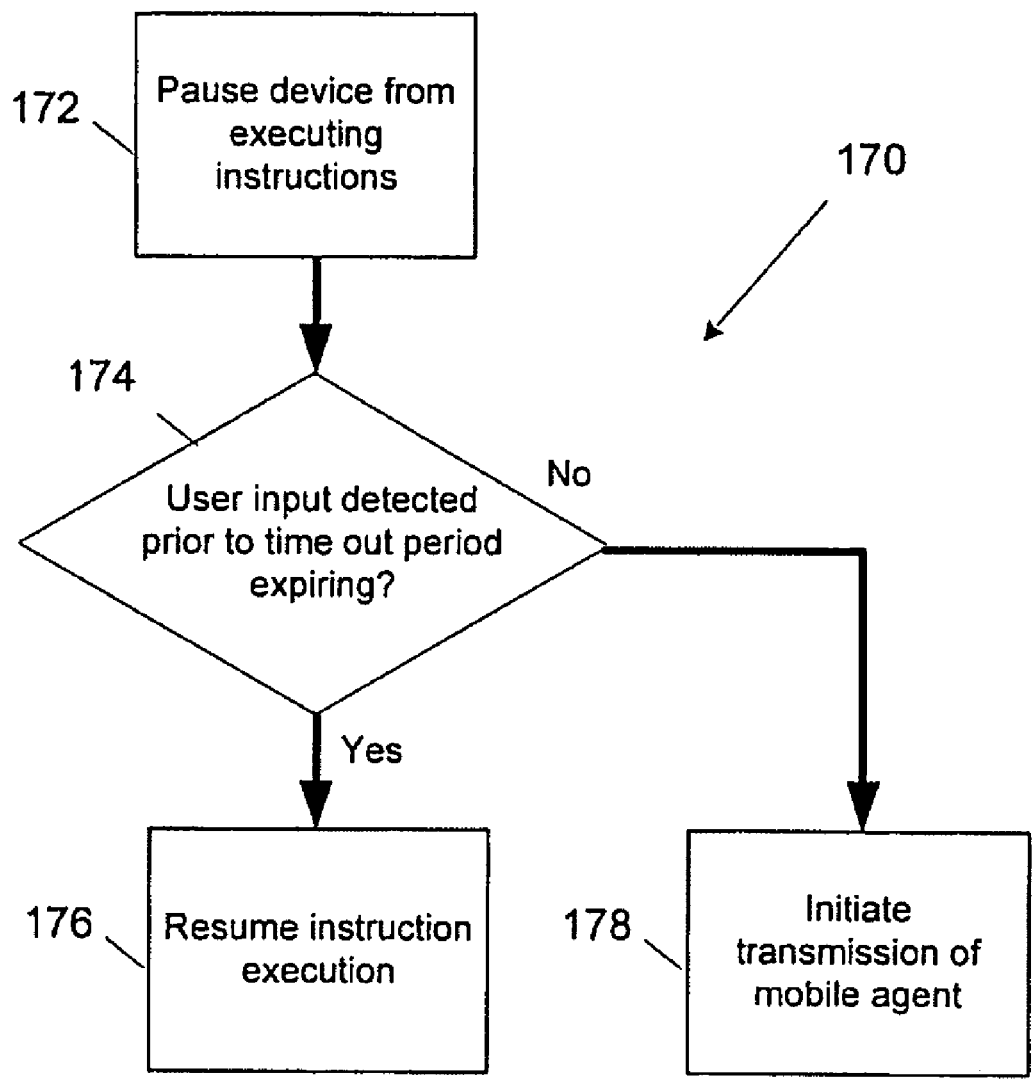
FIG. 14 is a flow chart that represents operations initiated by executing a SLEEP bytecode instruction.

Referring to FIG. 14, a flowchart 170 represents the operations provided by the SLEEP bytecode instruction. In general the SLEEP instruction halts further instruction execution until a time out period has expired or an external event has occurred such as a user interacting with the device that executed the SLEEP instruction. This instruction provides the pausing capability that is also used in the MESG, ESEL, and ALERT bytecode instructions. In particular, executing the SLEEP instruction pauses 172 the device from executing further instructions and determines 174 if an external event (e.g., input from a user) has occurred prior to the expiration of a time out period. If an external event has been detected prior to the end of the time out period, the SLEEP instruction releases the device that executed the SLEEP instruction and allows the device to continue 176 to execute other instructions. If the time out period expires prior to an external event occurring, the SLEEP instruction initiates 178 the transmitting of the mobile agent to one or more devices (which may or may not include the device currently executing the SLEEP instruction). By transmitting to one or more devices, the mobile agent can transit to other devices to track down and interact with the user associated with the devices.

While FIGS. 7-14 have been used to describe some bytecode instructions that may be stored and transmitted in one or more mobile agents, other types of bytecode instructions may also be included. For example flow control instructions may be included in mobile agents for calling subroutines. Comparison bytecode instructions (e.g., branch if equal, branch if not equal, etc.) may also be included in the mobile agents to provide conditional logic. Stack operation instructions (e.g., POP, PUSH, etc.) may be used to manipulate data on one or more stacks during program execution. Along with the more general instructions, specialized bytecode instructions for particular devices may also be included in and transmitted with the mobile agents.

A number of implementations have been described. Nevertheless, it will be understood that various modifications may be made. Accordingly, other implementations are within the scope of the following claims.

What is claimed is:

1. A method for executing operations on a device, comprising the steps of:
    executing one or more bytecode language instructions associated with a mobile agent that includes a state of a virtual machine, wherein the bytecode language includes at least one instruction from the group consisting of WARP, MESG, ESEL, ALERT, BROWSE, CAPS, SLEEP, and GPS.

2. The method of claim 1, wherein the WARP instruction defines transmitting the state of the virtual machine.

3. The method of claim 1, wherein the MESG instruction defines presenting information on a display.

4. The method of claim 1, wherein the MESG instruction defines collecting user input.

5. The method of claim 1, wherein the ESEL instruction defines providing a selection to a user.

6. The method of claim 1, wherein the ALERT instruction defines issuing an alarm.

7. The method of claim 6, wherein issuing the alarm includes presenting a visual alarm.

8. The method of claim 6, wherein issuing the alarm includes producing an audible alarm.

9. The method of claim 1, wherein the BROWSE instruction defines initiating an Internet browser.

10. The method of claim 1, wherein the SLEEP instruction defines a time period to delay executing a second instruction.

11. The method of claim 10, wherein an external event reduces the delay time period and initiates execution of the second instruction.

12. The method of claim 1, wherein the CAPS instruction defines a word that describes capabilities of a device that receives the mobile agent.

13. The method of claim 1, wherein the GPS instruction defines determining global positioning system coordinates.

14. A computer program product residing on a computer readable medium having a plurality of instructions stored thereon which, when executed by a processor, cause the processor to:
    execute one or more bytecode language instructions associated with a mobile agent that includes a state of a virtual machine, wherein the bytecode language includes at least one from the group consisting of WARP, MESG, ESEL, ALERT, BROWSE, CAPS, SLEEP, and GPS.

15. The computer program product of claim 14, wherein the WARP instruction defines transmitting the state of the virtual machine.

16. The computer program product of claim 14, wherein the MESG instruction defines presenting information on a display.

17. The computer program product of claim 14, wherein the MESG instruction defines collecting user input.

18. The computer program product of claim 14, wherein the ESEL instruction defines providing a selection to a user.

19. The computer program product of claim 14, wherein the ALERT instruction defines issuing an alarm.

20. The computer program product of claim 19, wherein the alarm includes presenting a visual alarm.

21. The computer program product of claim 19, wherein the alarm includes producing an audible alarm.

22. The computer program product of claim 14, wherein the BROWSE instruction defines initiating an Internet browser.

23. The computer program product of claim 14, wherein the SLEEP instruction defines a time period to delay executing a second instruction.

24. The computer program product of claim 23, wherein an external event reduces the delay time period and initiates execution of the second instruction.

25. The computer program product of claim 14, wherein the CAPS instruction defines a word that describes capabilities of a device that receives the mobile agent.

26. The computer program product of claim 14, wherein the GPS instruction defines determining of global positioning system coordinates.

27. An executable instruction set, comprising:
    one or more bytecode language instructions associated with a mobile agent that includes a state of a virtual machine, wherein the bytecode language includes at least one instruction from the group consisting of WARP, MESG, ESEL, ALERT, BROWSE, CAPS, SLEEP, and GPS.

28. The executable instruction set of claim 27, wherein the WARP instruction defines transmitting the state of the virtual machine.

29. The executable instruction set of claim 27, wherein the MESG instruction defines presenting information on a display.

30. The executable instruction set of claim 27, wherein the MESG instruction defines collecting user input.

31. The executable instruction set of claim 27, wherein the ESEL instruction defines providing a selection to a user.

32. The executable instruction set of claim 24, wherein the ALERT instruction defines issuing an alarm.

33. The executable instruction set of claim 32, wherein issuing the alarm includes presenting a visual alarm.

34. The executable instruction set of claim 32, wherein issuing the alarm includes producing an audible alarm.

35. The executable instruction set of claim 27, wherein the BROWSE instruction defines initiating an Internet browser.

36. The executable instruction set of claim 27, wherein the SLEEP instruction defines a time period to delay executing a second instruction.

37. The executable instruction set of claim 36, wherein an external event reduces the time delay period and initiates execution of the second instruction.

38. The executable instruction set of claim 27, wherein the CAPS instruction defines a word that describes capabilities of a device that receives the mobile agent.

39. The executable instruction set of claim 27, wherein the GPS instruction defines determining global positioning system coordinates.

* * * * *